United States Patent Office

Re. 27,451
Reissued Aug. 1, 1972

27,451
POLYOLEFINS STABILIZED WITH SUBSTITUTED INDOLES

Ralph Holm Hansen, Short Hills, N.J., assignor to Bell Telephone Laboratories, Incorporated, Murray Hill, N.J.

No Drawing. Original No. 3,454,524, dated July 8, 1969, Ser. No. 690,419, Dec. 14, 1967. Application for reissue Feb. 11, 1971, Ser. No. 114,738
Int. Cl. C08f *45/60*
U.S. Cl. 260—45.8 N 3 Claims

Matter enclosed in heavy brackets [ ] appears in the original patent but forms no part of this reissue specification; matter printed in italics indicates the additions made by reissue.

ABSTRACT OF THE DISCLOSURE

Oxidative degradation in polymeric hydrocarbon materials such as polyethylene and polypropylene is retarded by [substituted indoles] *certain nitrogen-containing heterocyclic compounds* which heretofore have not been known to have antioxidant properties.

This invention relates to stabilized polymeric compositions. More particularly, the present invention relates to essentially saturated hydrocarbon polymeric materials having included therein small amounts of additives which have been found to exhibit a retarding effect on deleterious oxidation of the material.

Considerable study has been devoted to the effects and prevention of thermal oxidation in the more common saturated polymers, particularly polyethylene and polypropylene. Thermal oxidation as discussed herein is oxidation normally occurring in ordinary atmospheres, essentially independent of ultraviolet light, which varies or accelerates with increasing temperature. In recent years, a wide variety of antioxidant materials have been developed to provide a marked retardation of thermal oxidation. These antioxidants characteristically require an antioxidant radical such as a secondary amino group or a hydroxyl group attached to an aromatic ring, such compounds resulting in a resonant stabilized structure. Typically, these compounds also contain additional substituents such as branched or normal aliphatic groups. More thorough treatment of antioxidant materials and the mechanism involved therein may be found in G. W. Whelands, "Advanced Organic Chemistry," 2nd edition, chapters 9 and 10.

The particular polymeric materials suitable for use in accordance with the present invention are polymers containing tertiary hydrogen atoms. Such polymers are of two general types, those containing random numbers and spacing of tertiary hydrogen atoms such as polyethylene and those containing ordered hydrogen atoms such as polypropylene. The present invention relates to either type and mixtures thereof or copolymers containing one or more of either type. Specific compounds suitable for the present invention are polymers of olefins such as polyethylene, both conventional, and the higher density materials, polypropylene, poly-4-methyl-pentene-1, poly-4,4-dimethyl pentene-1, polydodecene-1, and poly-3-methyl butene-1.

Although the most common polymeric materials falling within the class delineated above are the polymerization products of monomers containing four or fewer carbon atoms, polymerized products of high order monomers and copolymers and mixtures containing such polymers may also be stabilized in accordance with the invention. For a discussion of the oxidative mechanism against which protection is imparted in accordance with the invention, see "Modern Plastics," vol. 31, pages 121 through 124, September 1953.

Some of the polymeric materials included in the class set forth above have already attained considerable commercial importance, notably polypropylene and the variout types of polyethylene. The other materials in this class have excellent electrical and mechanical properties and undoubtedly will find widespread use in the near future.

Many of the most important applications of polyethylene such as its use in cable sheathings depend on its very good mechanical properties such as high tensile strength and abrasion resistance coupled with its resistant properties against water and water vapor. Other uses take advantage of its dielectric strength in applications such as primary insulation of wire conductors. Some consequences of thermal oxidation in such polymers are an increase in the brittle point, impairment of tensile strength and poorer dielectric properties. Accordingly, a successful use of these materials in applications presently contemplated requires the use of an efficacious antioxidant material.

In accordance with the present invention, it has been determined that [a new class of] *certain organic* compounds manifest[s] a significant antioxidant effect when added to the polymers of interest. The materials contemplated for use herein are [substituted indoles of the general formula

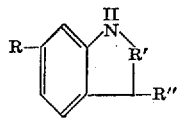

wherein R is selected from among hydrogen or hydroxyl radicals, R' is selected from among NH or $CH_2$ radicals, and R'' is selected from among $H_2$ and =O] *selected from the group consisting of 5-hydroxyoxindole, 5-hydroxyindole and 3-indazolinone.*

It has been found advantageous in the practice of the present invention to employ amounts of antioxidants ranging from 0.05–5 percent, by weight, the minimum being dictated by the amount necessary to effect significant antioxidant properties, and the maximum being dictated by practical considerations.

In order to aid in the understanding of the present invention, an outline of the procedure employed in determining antioxidant effect will now be given.

Initially, the saturated hydrocarbon polymer together with the antioxidant of interest was prepared by mill massing of a 6" x 12" 2-roll mill having roll speeds of approximately 24 and 35 r.p.m., with the rolls at a temperature of about 120° C. Either 0.1 percent or 0.5 percent of antioxidant was incorporated into the polymers being tested. The polyethylene used in the studies was a commercial high molecular weight, high pressure polymer supplied by the Bakelite Company as DYNK. The polypropylene used was a homopolymer "base flake" made by the Avisun Corporation which is a virgin uninhibited polypropylene. Test samples approximately 10 mils in thickness in the form of a disk were obtained by means of a punching device. These disks were then placed on the sensitive element of a different thermal analysis apparatue, aluminum oxide being used as a reference. Thereafter, with oxygen flowing, the test samples were heated at a rate of 10° C. per minute until the polymer oxidized, as evidenced by the evolution of heat on the sample pan. In an alternative procedure, the test samples were heated in the presence of nitrogen to a temperature of 196° C., at which point the nitrogen flow was halted and replaced by oxygen, the time required for an exotherm to occur being measured.

For convenience, the results of these tests with various materials have been tabulated as set forth in the table.

TABLE

| Polymer | Antioxidant A/O | Amount A/O (percent) | Time to attain exotherm (min.) | Temp. of exotherm (° C.) |
|---|---|---|---|---|
| (1) Polyethylene | | | <1 | 180 |
| (2) Polypropylene | | | <1 | 160 |
| (3) Polyethylene | 5-hydroxyoxindole | 0.5 | 23.6 | 240.7 |
| (4) Polyethylene | 5-hydroxyindole | 0.5 | 14.2 | 215.6 |
| (5) Polyethylene | 3-indaxolinone | 0.5 | 38.3 | 239.1 |
| (6) Polyethylene | Phenol | 0.5 | <1 | 181.3 |
| (7) Polyethylene | 4,4'-thiobis(3-methyl-6-tert.butyl)phenol | 0.1 | 32.8 | 231.2 |
| (8) Polyethylene | 5-hydroxyindole | 0.1 | | 178.1 |
| (9) Polyethylene | 5-hydroxyoxindole | 0.1 | | 209.3 |
| (10) Polyethylene | 3-indaxolinone | 0.1 | | 210.9 |
| (11) Polypropylene | do | 0.5 | 18.1 | 214 |
| (12) Polypropylene | 5-hydroxyindole | 0.5 | | 184.4 |

Analyzing the data set forth above, it is apparent that the use of the materials contemplated herein evidence a marked superiority over the unstabilized polyethylene and polypropylene, and it will be apparent to those skilled in the art that any compound having the same general character as those specifically set forth can be employed without departing from the spirit and scope of the appended claims. The novel stabilizers described herein have also been found to be as efficacious as many of the now conventional antioxidants as evidenced by reference to Example 7 in the table showing the antioxidant effect of 4,4'-thiobis(3-methyl-6-tert.butyl)phenol. The marked superiority of the described antioxidants over phenol is shown in Example 6.

What is claimed is:

1. A composition stabilized against oxidation degradation comprising a normally solid polymer of an α-olefin having incorporated therein a compound [of the general formula

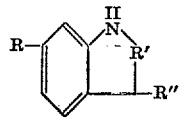

wherein R is selected from the group consisting of H and OH, R' is selected from the group consisting of NH and $CH_2$, and R'' is selected from the group consisting of $H_2$ and =O] *selected from the group consisting of 5-hydroxyoxindole, 5-hydroxyindole and 3-indazolinone,* said compound being present in an amount ranging from 0.05–5 percent, by weight.

2. A composition in accordance with claim 1 wherein the solid polymer comprises polyethylene.

3. A composition in accordance with claim 1 wherein the solid polymer comprises polypropylene.

References Cited

The following references, cited by the Examiner, are of record in the patented file of this patent or the original patent.

UNITED STATES PATENTS

| | | | |
|---|---|---|---|
| 3,110,696 | 11/1963 | Dexter | 260—45.8 |
| 3,218,276 | 11/1965 | Ringwald et al. | 260—23 |
| 3,325,445 | 6/1967 | Harris et al. | 260—45.8 |
| 3,325,499 | 6/1967 | Poos | 260—294 |
| 3,367,907 | 2/1968 | Hansen | 260—45.8 |

DONALD E. CZAJA, Primary Examiner

R. A. WHITE, Assistant Examiner

U.S. Cl. X.R.

260—45.95